(12) United States Patent
Miyashita et al.

(10) Patent No.: US 10,160,404 B2
(45) Date of Patent: Dec. 25, 2018

(54) MULTILAYER COMPOSITE INTERIOR COMPONENT

(71) Applicant: TOYODA IRON WORKS CO., LTD., Toyota-shi, Aichi-ken (JP)

(72) Inventors: Osamu Miyashita, Toyota (JP); Kenji Onuma, Toyota (JP); Kenichi Yoshida, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 4 days.

(21) Appl. No.: 15/535,953

(22) PCT Filed: Dec. 16, 2015

(86) PCT No.: PCT/JP2015/085270
§ 371 (c)(1),
(2) Date: Jun. 14, 2017

(87) PCT Pub. No.: WO2106/098827
PCT Pub. Date: Jun. 23, 2016

(65) Prior Publication Data
US 2017/0334371 A1    Nov. 23, 2017

(30) Foreign Application Priority Data

Dec. 19, 2014 (JP) ................. 2014-258080
Jul. 27, 2015 (JP) ................. 2015-147881

(51) Int. Cl.
*B23B 3/30* (2006.01)
*B60R 13/02* (2006.01)
(Continued)

(52) U.S. Cl.
CPC ........ *B60R 13/0243* (2013.01); *B29C 33/005* (2013.01); *B29C 33/42* (2013.01);
(Continued)

(58) Field of Classification Search
CPC .............. Y10T 428/24182; B32B 3/30; B60R 13/0237; B60R 2021/0435; B29L 2031/3041
See application file for complete search history.

(56) References Cited

U.S. PATENT DOCUMENTS

2015/0072105 A1   3/2015  Miyashita et al.
2016/0101743 A1   4/2016  Miyashita et al.

FOREIGN PATENT DOCUMENTS

JP      2000-177468       6/2000
WO    WO/2013/132677 A1   9/2013
WO    WO 2014/184903 A1  11/2014

OTHER PUBLICATIONS

English translation of the International Preliminary Report on Patentability for International Application No. PCT/JP2015/085270 dated Jun. 20, 2017.
(Continued)

*Primary Examiner* — Alexander S Thomas
(74) *Attorney, Agent, or Firm* — Finnegan, Henderson, Farabow, Garrett & Dunner, LLP

(57) ABSTRACT

Provided is a multilayer composite interior component in which boundary protrusions (20*b*) aligned in a row on both sides of a parting line (L) are arranged in a staggered manner so as to bend toward the boundary protrusions (20*b*) in the row opposite thereto. In this way, even when the boundary protrusions (20*b*) are separated from the parting line (L) by a predetermined distance (g1, g2) in order to maintain the strength of a divided mold, the boundary protrusions (20*b*) bend and deform so as to fill in an empty part in the vicinity of the parting line (L) when a surface layer member (16) is pressed by fingers or a hand. As a result, a feeling of unevenness resulting from decreases in reaction force in the
(Continued)

vicinity of the parting line (L) is minimized, thus making it possible to obtain a more uniform texture.

12 Claims, 12 Drawing Sheets

(51) Int. Cl.
| | |
|---|---|
| *B29C 33/00* | (2006.01) |
| *B29C 33/42* | (2006.01) |
| *B32B 3/30* | (2006.01) |
| *B32B 27/08* | (2006.01) |
| *B32B 27/30* | (2006.01) |
| *B32B 5/02* | (2006.01) |
| *B32B 7/12* | (2006.01) |
| *B32B 27/06* | (2006.01) |
| *B32B 27/12* | (2006.01) |
| *B32B 27/32* | (2006.01) |
| *B32B 3/04* | (2006.01) |
| *B32B 3/20* | (2006.01) |
| *B29K 27/06* | (2006.01) |
| *B29L 9/00* | (2006.01) |
| *B29L 31/30* | (2006.01) |

(52) U.S. Cl.
CPC ............... *B32B 3/04* (2013.01); *B32B 3/20* (2013.01); *B32B 3/30* (2013.01); *B32B 5/022* (2013.01); *B32B 5/024* (2013.01); *B32B 5/026* (2013.01); *B32B 7/12* (2013.01); *B32B 27/06* (2013.01); *B32B 27/08* (2013.01); *B32B 27/12* (2013.01); *B32B 27/30* (2013.01); *B32B 27/304* (2013.01); *B32B 27/32* (2013.01); *B60R 13/02* (2013.01); *B29K 2027/06* (2013.01); *B29L 2009/00* (2013.01); *B29L 2031/3041* (2013.01); *B32B 2250/02* (2013.01); *B32B 2307/51* (2013.01); *B32B 2307/546* (2013.01); *B32B 2307/56* (2013.01); *B32B 2451/00* (2013.01); *B32B 2605/003* (2013.01); *Y10T 428/24182* (2015.01)

(56) References Cited

OTHER PUBLICATIONS

English translation of the Written Opinion of the International Searching Authority for International Application No. PCT/JP2015/085270 dated Mar. 8, 2016.

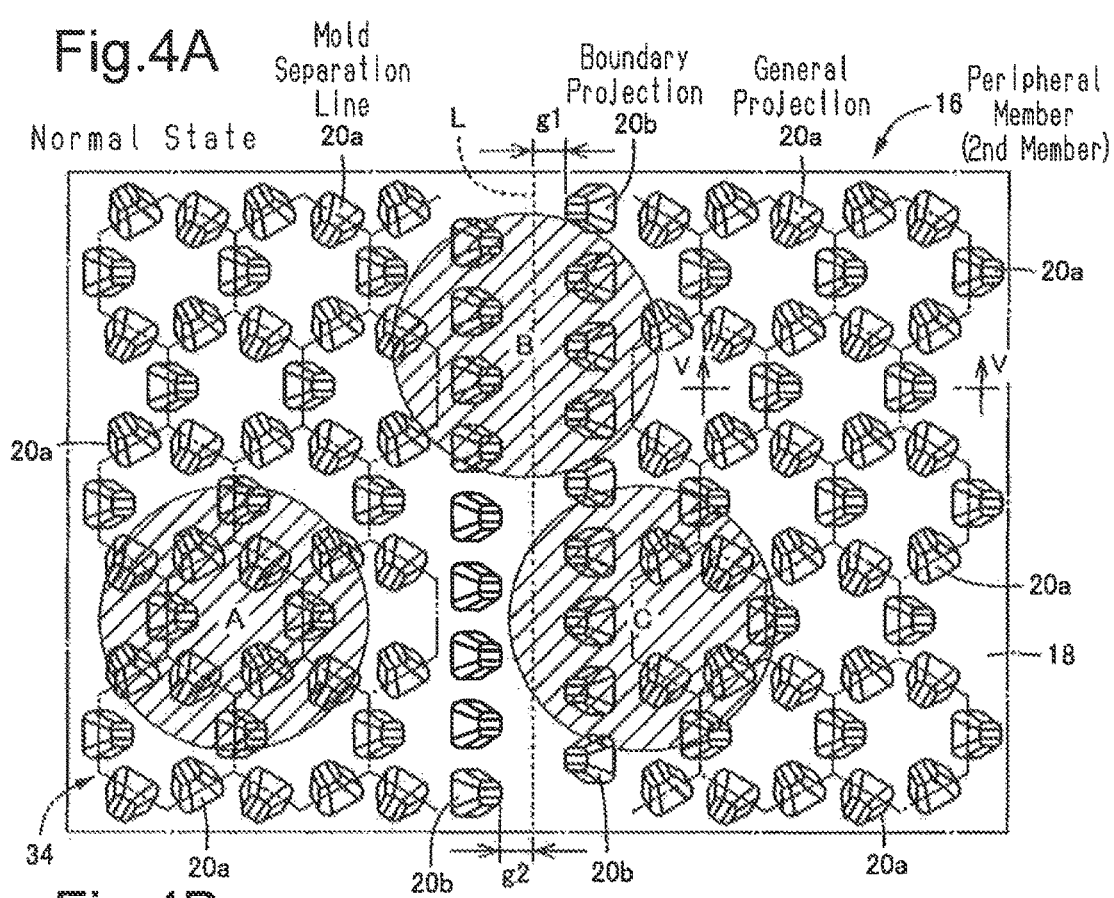
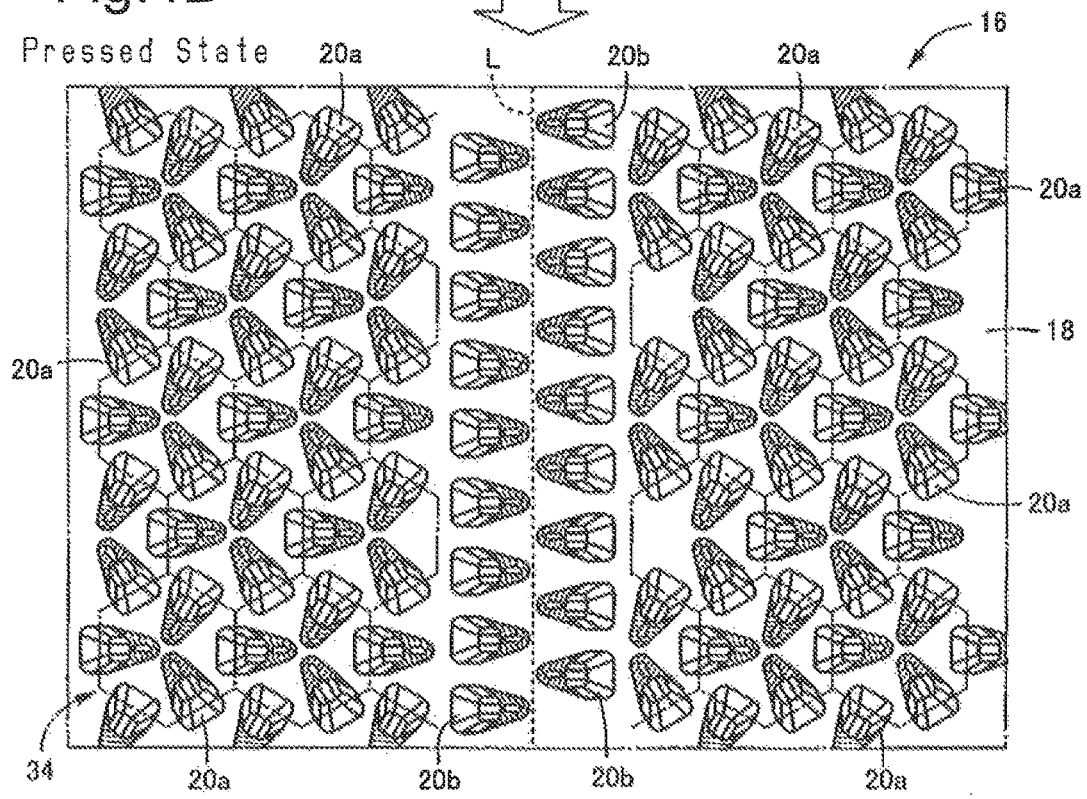

Normal State

Pressed State

Fig.14A Normal State
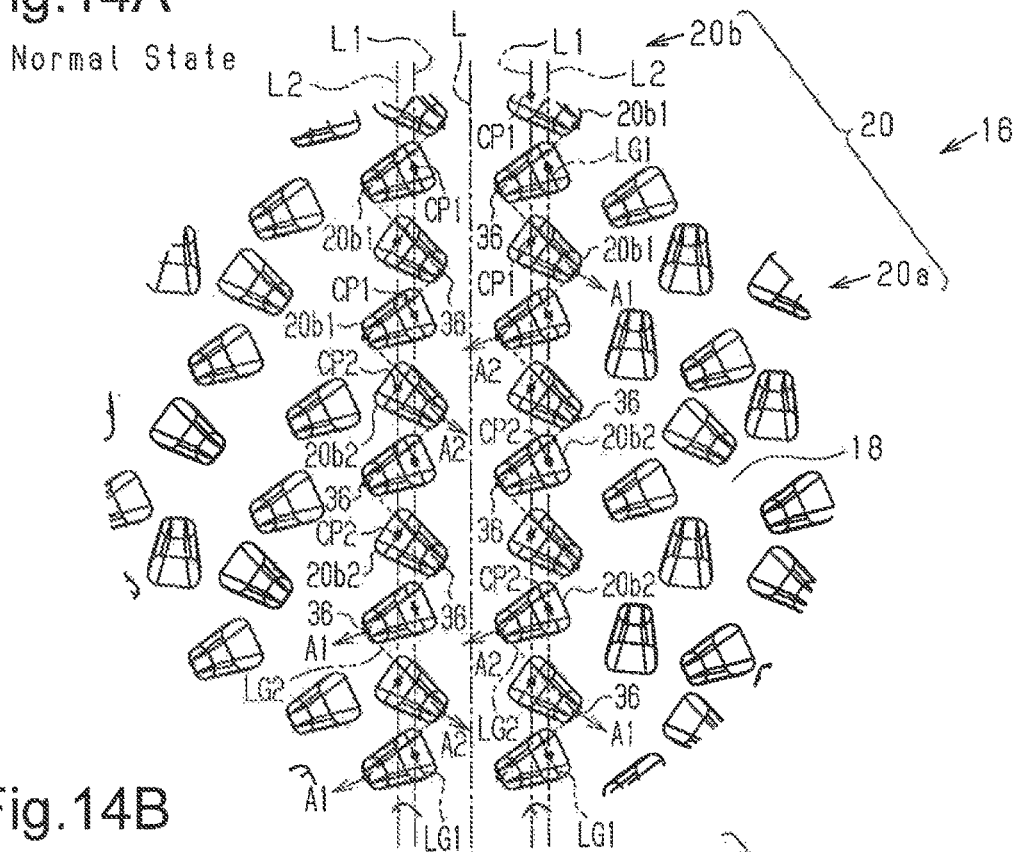
Fig.14B Pressed State
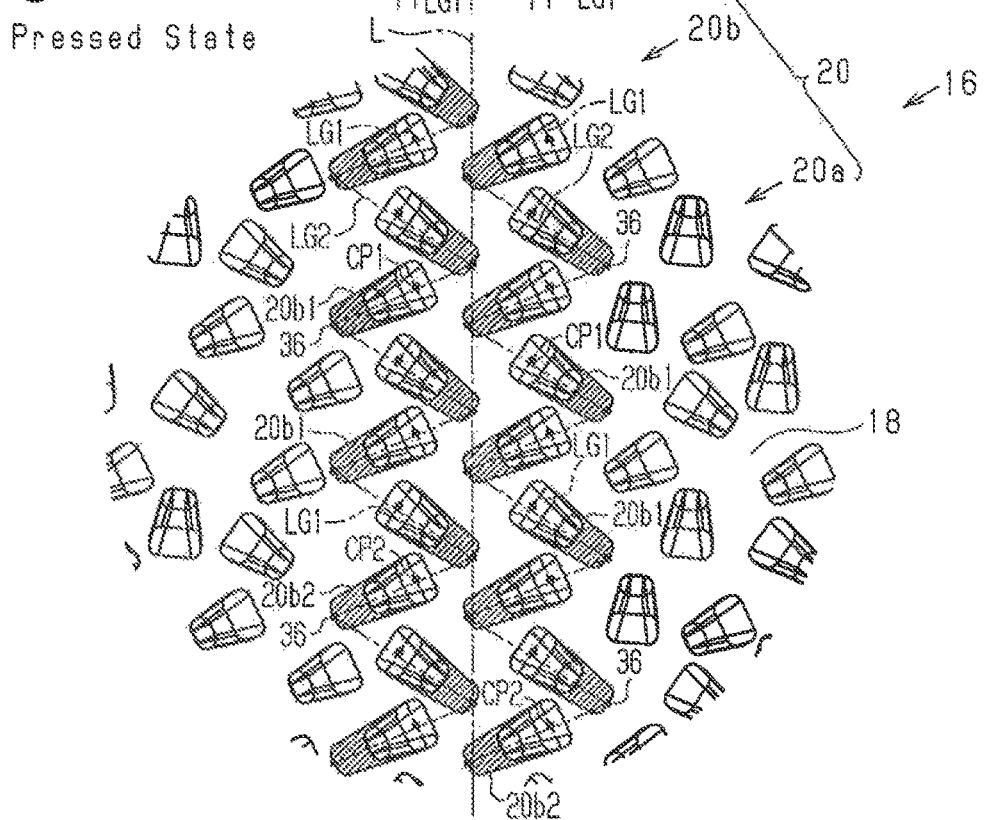

Fig.15A Normal State
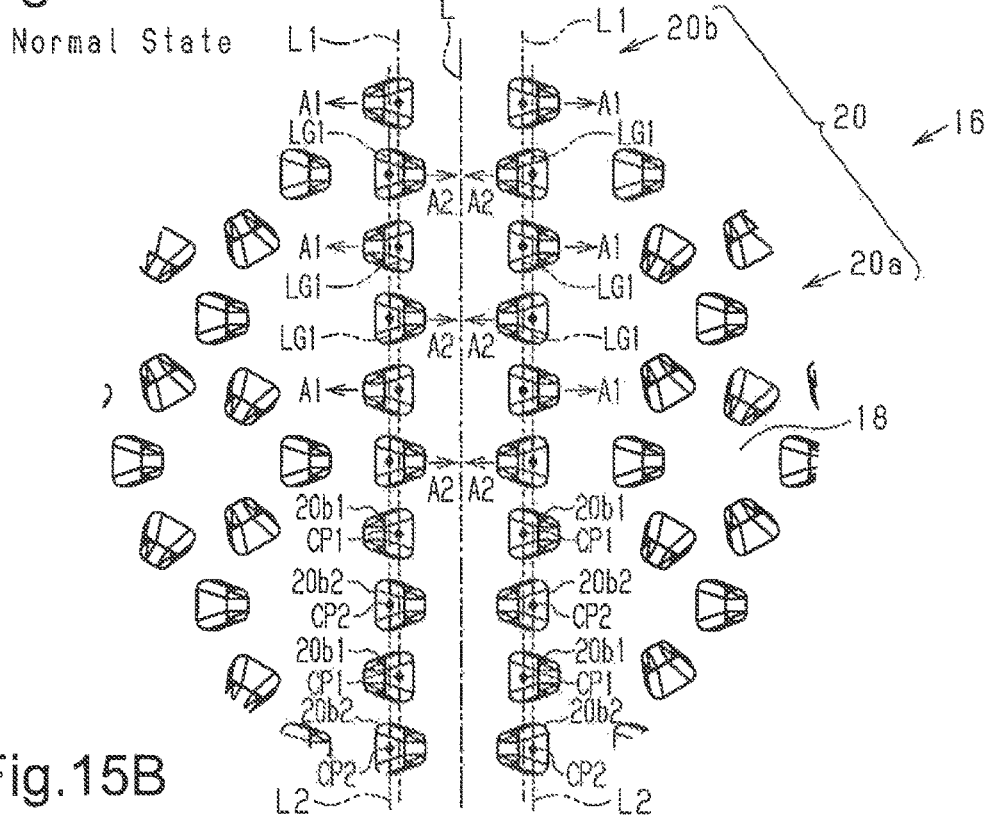
Fig.15B Pressed State
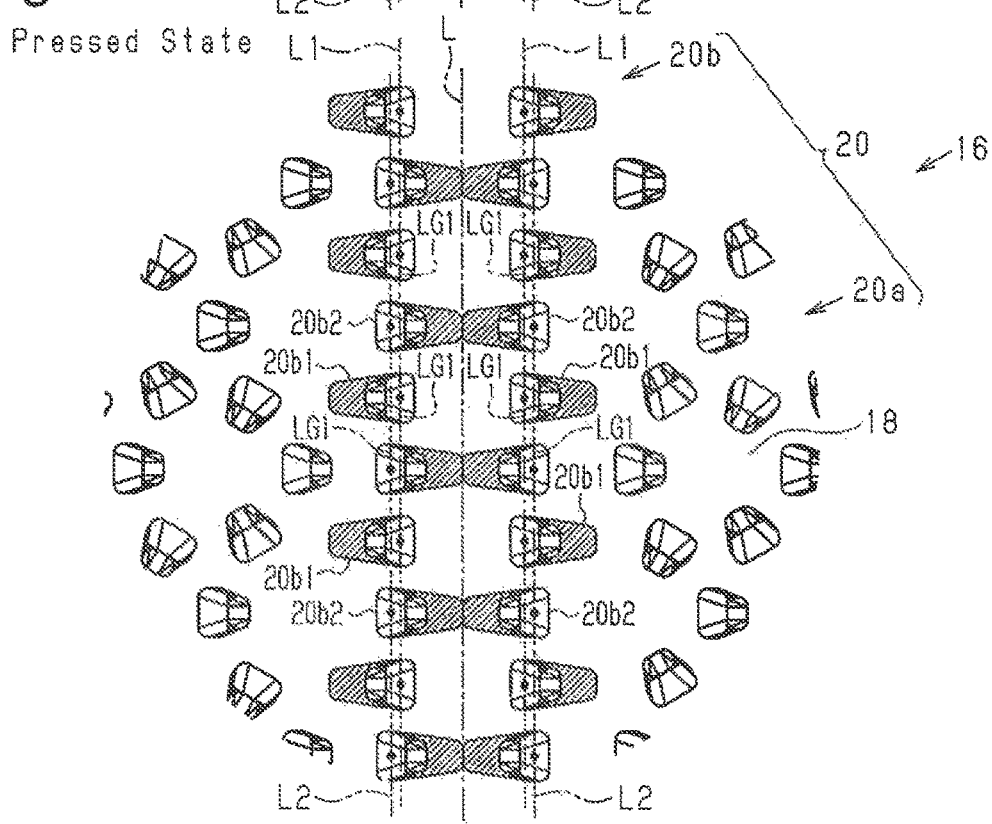

MULTILAYER COMPOSITE INTERIOR COMPONENT

CROSS-REFERENCE TO RELATED APPLICATIONS

This application is a national phase application of International Application No. PCT/JP2015/085270, filed Dec. 16, 2015, and claims the priority of Japanese Application No. 2014-258080, filed Dec. 19, 2014 and Japanese Application No. 2015-147881 filed Jul. 27, 2015, the content of all of which is incorporated herein by reference.

TECHNICAL FIELD

The present invention relates to a multilayer composite interior component.

BACKGROUND ART

A composite interior component known in the prior art includes a first member, which has a predetermined joining surface, and a second member, which is arranged on the first member and formed from an elastically deformable synthetic resin. The second member includes a plate portion that is substantially parallel to the joining surface of the first member. The plate portion includes a plurality of projections, each projecting toward the joining surface of the first member to define a gap between the plate portion and the joining surface. The composite interior component produces a cushioning effect when the distal portions of the projections of the second member are pressed and elastically deformed by the joining surface of the first member. Patent document 1 describes a multilayer composite component that controls bending directions of the projections to limit variations in the texture of the multilayer composite component when pressed by a finger or a hand.

However, when the prior art multilayer composite component is pressed with a finger or a hand, the person may feel irregularities because the texture differs from one location to another due to the following reason. More specifically, when a composite component is large and has a complex shape, the mold that forms a projection surface of the second member may be formed by a plurality of separate molds taking into consideration removability of the molds for the second member and maintenance of the molds. In this case, to ensure the strength of the separate molds, it is difficult to arrange projections in the proximity of edges of the separate molds. Thus, vacant portions having no projection are formed in the proximity of a mold separation line, or a parting line, of the separate molds. As a result, an appropriate reaction force and a uniform texture cannot be obtained from a portion of the composite component when pressed by a finger or a hand.

FIGS. 12A and 12B are plan views of a second member 104 taken from projections 102. The second member 104 includes a plate portion 100 and the projections 102, which are located on the plate portion 100. The projections 102, which have the same shape, are each inclined in the direction of the corresponding arrow shown in FIG. 12B. The projections 102 are arranged on each side of an equilateral hexagonal lattice pattern 106, which is indicated by double-dashed lines and has a honeycomb shape, and alternately directed in opposite directions. In this structure, when a load is applied to the plate portion 100 in a direction orthogonal to the plate portion 100, each projection 102 is bent as indicated by the oblique lines in FIG. 12B. The consequent reaction force allows the composite component to obtain a substantially uniform texture. However, when the separate molds are used to form a composite component, the projections 102 are excluded from the proximity of a mold separation line L of the separate molds to ensure the strength of the separate molds. Thus, the appropriate reaction force cannot be obtained. In this regard, a pressing piece is orthogonally pressed from the plate portion 100 against a reverse side of the second member 104 to determine characteristics of the reaction force in points A, B shown in FIG. 12A. The pressing piece has a circular end, the diameter of which is 14 mm. FIG. 13 shows the result indicating that the reaction force difference Δf between the point A and the point B is 8 N or larger when the stroke of the pressing piece is 2 mm. FIG. 12A includes hatching portions, each of which is a region that is pressed by the pressing piece with the diameter of 14 mm, indicating the size corresponding to a human fingertip.

PRIOR ART DOCUMENT

Patent Document

Patent Document 1: International Patent Publication No. WO2013/132677

SUMMARY OF THE INVENTION

Problems that are to be Solved by the Invention

It is an object of the present invention to provide a multilayer composite interior component that limits decreases in the reaction force in the proximity of a mold separation line thereby limiting texture variations.

Means for Solving the Problem

To achieve the above object, a first aspect of the present invention provides a multilayer composite interior component that includes a first member and a second member that is arranged on the first member. The second member is formed using a plurality of separate molds. The second member includes a plurality of general projections, each projecting toward the first member and bent by contact with the first member, and a plurality of boundary projections located between a mold separation line of the separate molds and the general projections and projecting toward the first member and bent by contact with the first member. The boundary projections are arranged at equal intervals in rows along the mold separation line at opposite sides of the mold separation line. Each interval of the boundary projections is shorter than a distance between the general projections located adjacent to each other along the mold separation line.

This structure allows the boundary projections to be located in the proximity of the mold separation line at a higher density than a prior art multilayer composite interior component that excludes general projections from the proximity of the mold separation line. This limits decreases in the reaction force in the proximity of the mold separation line. Consequently, variations in the texture of the second member when pressed are reduced between the proximity of the mold separation line and another portion.

Preferably, in the multilayer composite interior component, the second member includes a projection surface on which the boundary projections project, and the boundary projections project in a state inclined toward the mold separation line relative to a normal line that is orthogonal to the projection surface of the second member.

In this structure, the boundary projections are bent by contact with the first member so as to collapse to the mold separation line. Consequently, elastic force of the bent and deformed projections acts on the proximity of the mold separation line. This limits decreases in the reaction force in the proximity of the mold separation line.

Preferably, in the multilayer composite interior component, the boundary projections are located at opposite sides of the mold separation line, and the boundary projections located at one side of the mold separation line are not opposed to the boundary projections located at the other side of the mold separation line.

In this structure, when the boundary projections located at one side of the mold separation line are bent and deformed, the boundary projections easily enter between adjacent ones of the boundary projections located at the other side. This allows for dispersion of reaction force that is received by the boundary projections when contacting the first member as compared to a structure in which the boundary projections located at opposite sides of the mold separation line are opposed to each other. This limits irregular textures in the proximity of the mold separation line.

Preferably, in the multilayer composite interior component, the second member includes an ornamental surface located at a side opposite to the general projections and the boundary projections, the boundary projections include a first projection located at a position separated from the mold separation line by a first distance and a second projection located at a position separated from the mold separation line by a second distance that differs from the first distance, and the first projection and the second projection are alternately arranged as viewed from the mold separation line.

In this structure, the boundary projections are alternately located between the position close to the mold separation line and the position separated from the mold separation line. Thus, thick portions of the boundary projections are not linearly arranged in the second member. This limits formation of uneven luster in the ornamental surface.

Preferably, in the multilayer composite interior component, each of the general projections and the boundary projections includes a basal portion and a distal portion and is formed by a conical body, the contour of which is gradually decreased from the basal portion toward the distal portion, and the basal portion has a cross section that has a line-symmetric shape and extends longer in a perpendicular direction than in a particular direction. The perpendicular direction is orthogonal to the particular direction.

In this structure, the bending direction of each of the general projections and the boundary projections caused by contact with the first member is fixed to the particular direction in relation to the second moment of area. More specifically, each of the general projections and the boundary projections is constantly bent and deformed in the same manner. This limits changes is the texture depending on a load pressing the second member.

Preferably, in the multilayer composite interior component, the boundary projections include a third projection arranged to be directed in a first direction that extends away from the mold separation line and a fourth projection arranged to be directed in a second direction that extends toward the mold separation line, each of the first direction and the second direction corresponds to the particular direction, the second direction intersects the first direction, and the third projection and the fourth projection are alternately arranged as viewed from the mold separation line.

In this structure, the directions of the basal portions differ between the third projection and the fourth projection. Thus, a line segment connecting the basal portions of the third and fourth projections is arranged in a zigzag manner. More specifically, thick portions of the projections are not linearly arranged in the second member. This limits formation of unevenness in the ornamental surface. Additionally, in this case, line segments connecting contact points between the first member and each of the third projections and the fourth projections are arranged in a zigzag manner. More specifically, concentration of the contact points in the proximity of the mold separation line is limited as compared to a structure in which the line segments connecting contact points are linearly arranged. This disperses the reaction force when the boundary projections are bent and deformed. Thus, irregular textures are limited in the proximity of the mold separation line.

Preferably, in the multilayer composite interior component, a plurality of polygons, each of which has sides, forms a lattice pattern when each side of the polygons overlaps a side of an adjacent one of the polygons, and the general projections are arranged on each side of the polygons.

The structure limits variations in the texture of the second member, when pressed by a finger or a hand. The structure cooperates with the boundary projections located in the proximity of the mold separation line to obtain a superior texture having few irregularities.

Preferably, in the multilayer composite interior component, the first member includes a joining surface, the second member includes a plate portion located parallel to the joining surface of the first member, the plate portion includes the general projections, the general projections have a flexural rigidity against a load applied in a direction orthogonal to the plate portion, the flexural rigidity is anisotropic in the vicinity of an axis that is orthogonal to the plate portion, each of the general projections is configured to be bent in one direction that extends in the vicinity of the axis as the distal portion slides on the joining surface, the lattice pattern has a honeycomb shape in which equilateral hexagons having a fixed size are continuously repeated, each side of the equilateral hexagons has one of the general projections arranged thereon, and a bending direction of the general projections is alternately changed to an inner side and an outer side at the sides arranged about a center of each of the equilateral hexagons.

This structure allows the general projections to be arranged at a high density with the stances of the general projections changed corresponding to each side of the equilateral hexagons. This obtains a further uniform texture.

To achieve the above object, a second aspect of the present invention provides a multilayer composite interior component that includes a first member including a predetermined joining surface and a second member arranged on the first member and formed from an elastically deformable synthetic resin. The second member includes a plate portion that is substantially parallel to the joining surface. The plate portion includes a plurality of projections, each projecting toward the joining surface to define a gap between the plate portion and the joining surface. Each of the projections includes a distal portion. The second member is arranged on the first member with the distal portions of the projections in contact with the joining surface. The distal portions of the projections are pressed and elastically deformed by the jolting surface thereby producing a cushioning effect on the multilayer composite interior component. The second member includes a surface located at a side of the projections and formed using a plurality of separate molds. Boundary projections located at each of opposite sides of a mold separation line of the separate molds are arranged in one row at equal intervals along the mold separation line. The boundary projections have a flexural rigidity against a load applied in a direction orthogonal to the plate portion. The flexural rigidity is anisotropic in the vicinity of an axis that is orthogonal to the plate portion. Each of the boundary projections includes a distal portion and is configured to be bent in one direction that extends in the vicinity of the axis as the distal portion slides on the joining surface. The boundary projections located at the opposite sides of the mold separation line are arranged to be bent toward the boundary projections located in an opposing row. Each of the boundary projections is located at an intermediate portion of adjacent ones of the boundary projections located in the opposing row. The boundary projections are laid out in a staggered arrangement.

In this structure, to ensure the strength of the mold separation line, the boundary projections may be separated from the mold separation line by a predetermined distance. Even in this case, when the second member is pressed by a finger or a hand, the boundary projections are bent and deformed to fill the vacant portion located in the proximity of the mold separation line. This limits irregular textures that would be caused by decreases in the reaction force in the proximity of the mold separation line. Thus, a uniform texture is obtained.

Preferably, in the multilayer composite interior component, the boundary projections have the same shape, each of the boundary projections includes a basal portion and has a center line that is inclined at the basal portion relative to a direction orthogonal to the plate portion, each of the boundary projections is bent in an inclination direction that corresponds to one direction that extends in the vicinity of the axis, and the boundary projections located at the opposite sides of the mold separation line are arranged in rows so that the inclination directions of the boundary projections are the same in each row.

This structure facilitates formation of recesses in the molds that form the boundary projections. This reduces manufacturing costs including the cost for manufacturing the molds.

Preferably, in the multilayer composite interior component, the second member includes a general region separated from the mold separation line, a plurality of general projections is arranged in the general region, a plurality of polygons, each of which has sides, forms a lattice pattern when each side of the polygons overlaps a side of an adjacent one of the polygons, and the general projections are arranged on each side of the polygons.

This structure limits variations in the texture of the second member when pressed by a finger or a hand and cooperates with the boundary projections located in the proximity of the mold separation line to obtain a superior texture having few irregularities.

Preferably, in the multilayer composite interior component, the general projections have the same shape, the general projections have a flexural rigidity against a load applied in a direction orthogonal to the plate portion, the flexural rigidity is anisotropic in the vicinity of an axis that is orthogonal to the plate portion, each of the general projections includes a distal portion and is configured to be bent in one direction that extends in the vicinity of the axis as the distal portion slides on the joining surface, the lattice pattern has a honeycomb shape in which equilateral hexagons having a fixed size are continuously repeated, each side of the equilateral hexagons has one of the general projections arranged therein, and a bending direction of the general projections is alternately changed to an inner side and an outer side at the sides arranged about a center of each of the equilateral hexagons.

This structure allows the general projections to be arranged at a high density with the stances of the general projections changed corresponding to each side of the equilateral hexagons. Thus, a further uniform texture is obtained.

BRIEF DESCRIPTION OF THE DRAWINGS

FIG. 4A is a plan view of the peripheral layer member in a non-pressed state, and FIG. 4B is a plan view of the peripheral layer member in a pressed state.

FIG. 14A is a plan view showing a second embodiment of a peripheral layer member in a non-pressed state, and FIG. 14B is a plan view of the peripheral layer member in a pressed state.

FIG. 15A is a plan view showing a modified example of the second embodiment of the peripheral layer member in a non-pressed state, and FIG. 15B is a plan view of the peripheral layer member in a pressed state.

EMBODIMENTS OF THE INVENTION

Figure 1:
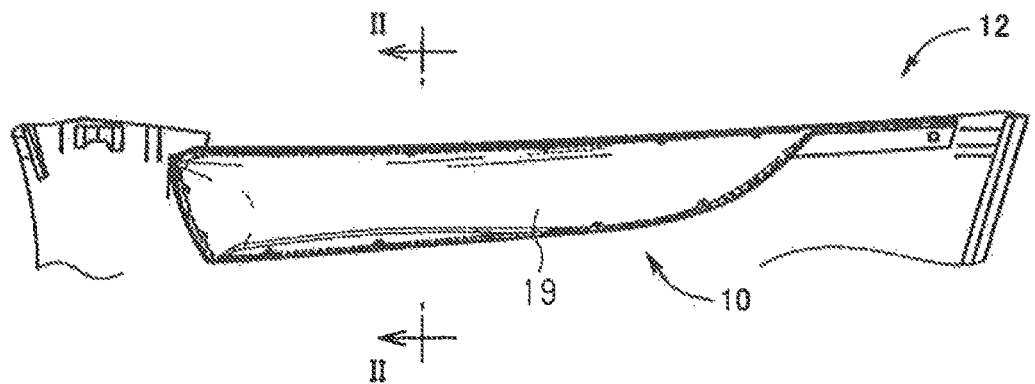
FIG. 1 is a front view showing the upper end of a vehicle door trim that includes one embodiment of an ornament according to the present invention taken from a passenger compartment.

Embodiments described below are applied to, for example, a door trim, a luggage side trim, a vehicle interior component such as an instrument panel, an ornament coupled to such an interior component, or an armrest. Additionally, the embodiments are applied to, for example, a non-vehicular panel component. Further, the embodiments described below are applied to not only a flat panel component but also a solid component in which a second member is arranged on a surface of a three-dimensional curved solid first member or base member. When the first member is used as the base member, rigid polyvinyl chloride or a relatively rigid synthetic resin material, such as polypropylene, polyethylene, or ABS, preferably used. When the first member is used as a peripheral layer member, soft polyvinyl chloride or a thermoplastic resin of various types such as a styrene type, an olefin type, and a polyester type is preferably used. Also, soft polyvinyl chloride or a thermoplastic resin of various types such as a styrene type, an olefin type, and a polyester type is preferably used as the resin material of the second member. Additionally, a covering member may be applied to the peripheral layer member. Various kinds of covering materials may be used as the covering member. Such covering materials include, for example, a woven cloth, a non-woven cloth, a knitted cloth, vinyl chloride, and a soft film in addition to soft polyvinyl chloride and a thermoplastic resin of various types such as a styrene type, an olefin type, and a polyester type. When the first member is used as the peripheral layer member, the second member includes projections and a rear surface opposite to the projections, and a relatively rigid base member may be arranged on the rear surface of the second member as necessary.

Preferably, the projections are each an elongated plate-shaped projection having a lateral cross section that is parallel to a plate portion and is, for example, rectangular. However, the lateral cross section of the projection may be, for example, square, circular, elliptical, or curved in conformance with the shape of an arc. Each of the projections may be tapered so that the area of the cross section becomes smaller toward the distal end of the projection. The projection has a cross-sectional shape in a direction in which the projection projects. The cross-sectional shape may be continuously changed. It is desirable that the projections be arranged at predetermined intervals in accordance with the heights of the projections to avoid interference with one another when the projections are bent and deformed. Alternatively, the projections may be arranged so that the deformed projections interfere with one another. In the specification, boundary projections and general projections may simply be referred to as "the projections."

Each of the boundary projections is configured to be bent in one direction that extends in the vicinity of an axis that is orthogonal to the plate portion. The boundary projection has, for example, an asymmetric longitudinal cross section and is configured to be bent in one direction as a joining surface presses and slides the distal portion. Although it is desirable that the boundary projections all have the same shape, some of the boundary projections may be of different types and have different shapes. The boundary projections, which are located at opposite sides of a mold separation line, are arranged to be bent toward opposing ones of the boundary projections, for example, in a direction orthogonal to the mold separation line. However, the bending directions of the boundary projections do not necessarily have to be orthogonal to the mold separation line and only need to at least intersect with the mold separation line. Additionally, it is desirable that the boundary projections located at opposite sides of the mold separation line be arranged in rows and bent in the same direction. However, the boundary projections may have different bending directions and be arranged in different phases relative to the axis. The mold separation line, that the shape of edges of the separate molds, may be curved as a curved line instead of being straight.

In the same manner as the boundary projections, it is desirable that each of the general projections be configured to be bent in one direction that extends in the vicinity of the axis orthogonal to the plate portion. The general projection has, for example, an asymmetric longitudinal cross section and is configured to be bent in one direction as the joining surface presses and slides the distal portion. However, the general projections may be a projection having a fixed symmetric longitudinal cross section such as a round cylinder or a cone or a projection having the form of a polygonal cylinder or a polygonal cone. The boundary projections and the general projections may all have the same shape.

When the width of each separate mold is narrow, only the boundary projections need to be arranged at opposite sides of the separate mold. The general projections may be arranged as necessary. In this case, it is desirable that the general projections be arranged on each side of polygons that form a lattice pattern. However, the general projections may be arranged on intersections of the lattice pattern or randomly arranged with no regularity. The lattice pattern refers to continuous repetition of equilateral polygons having the same shape such as equilateral triangles, squares, or equilateral hexagons. However, the lattice pattern may be continuous repetition of rectangles, rhomboids, parallelograms, non-equilateral triangles, or non-equilateral hexagons. Further, the lattice pattern may be a lattice pattern in which different kinds of polygons are regularly repeated or a lattice pattern in which different kinds of polygons are irregularly located adjacent to one another.

The general projections may be arranged so that, for example, two general projections are arranged on each side of a polygon. When a polygon is a rectangle or a parallelogram, which has sides of different lengths, the number of general projections may differ between a short side and a long side. When each of the general projections has an elongated lateral cross section, the general projection may be arranged so that the longitudinal direction of the lateral cross section extends parallel or orthogonal to a side of a polygon or intersects the side at a predetermined angle. The longitudinal direction of the general projection may be parallel or orthogonal to a side of a polygon depending on the position of the general projection in the lattice pattern.

Each of the projections has a center line that is inclined relative to the normal line of the plate portion by a constant inclination angle α from the basal portion to the distal portion. However, the inclination angle α may be changed in a continuous or stepped manner. Alternatively, the projection may be configured to be parallel to the normal line of the plate portion at the basal portion and inclined relative to the normal line only at the distal portion. In other words, the projection may include a portion that is parallel to the normal line of the plate portion defining an orthogonal portion. When the projection is orthogonal to the plate portion, the projection may have a longitudinal cross section in which one side wall has a step and the distal portion remains at a side opposite to the step. In this case, when a load is applied in the axial direction, the load is unevenly applied to the distal portion. This allows the distal portion to slide to the side opposite to the step. Consequently, the projection is entirely bent and deformed. Alternatively, one side wall of the longitudinal cross section may include an inclined surface instead of the step.

Preferably, the embodiments described below are applied to a plate-shaped panel component. More specifically, the second member is a peripheral layer member. The first member is a plate-shaped base member formed from a resin material that is more rigid than the material of the second member. The base member includes a front surface functioning as the joining surface. The peripheral layer member is arranged on the front surface of the base member and coupled to the base member. In this case, a covering member may be fixed to a surface of the plate portion of the peripheral layer member opposite to the projections to obtain a three-layer structure formed by the plate-shaped base member, the peripheral layer member, and the covering member. Alternatively, when the first member is a plate-shaped peripheral layer member formed from an elastically deformable resin material, and the second member includes projections, the above three-layer structure may be obtained by bringing the base member into close contact with the rear surface of the second member, which is opposite to the projections.

Embodiments

A first embodiment of the present invention will now be described in detail with reference to the drawings. For the sake of clarification, the drawings of the embodiments described below are simplified or deformed. Each component has not necessarily been drawn to scale or in the accurate shape.

Figure 2:
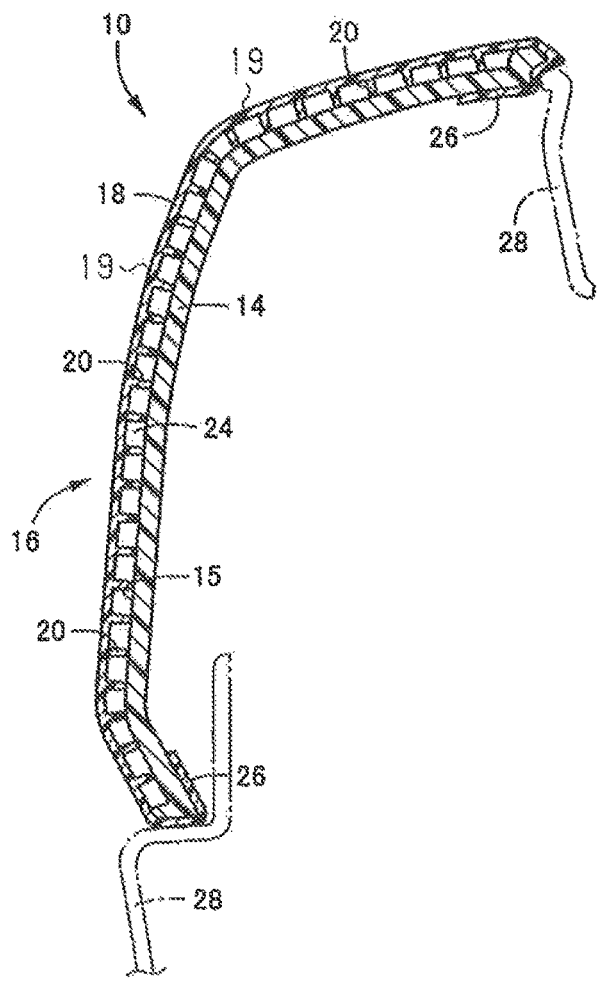
FIG. 2 is a cross-sectional view taken along line II-II in FIG. 1.

FIG. 1 is a schematic diagram of a vehicle door trim 12 that includes an ornament 10 according to the present invention at a shoulder portion of the upper end, that is, to portion located at the lower end of the window. FIG. 1 is a front view showing an ornamental surface 19 of a right vehicle door taken from the passenger compartment. FIG. 2 is a vertical cross-sectional view of the ornament 10 taken along line II-II in FIG. 1. The ornament 10 is a multilayer composite interior component that includes a plate-shaped base member 14 and a peripheral layer member 16. The base member 14 includes a front surface 15, on which the peripheral layer member 16 is arranged. The ornament 10 corresponds to a plate-shaped panel. The front surface 15 of the base member 14 corresponds to a joining surface.

The peripheral layer member 16 is a second member and formed from a relatively soft elastically deformable synthetic resin material, such as soft polyvinyl chloride. The peripheral layer member 16 includes a plate portion 18, which is arranged substantially parallel to the front surface 15 of the base member 14, and a plurality of projections 20, each projecting from a rear surface of the plate portion 18 toward the front surface 15 of the base member 14. The projections 20 define a gap 24 between the plate portion 18 and the front surface 15. The plate portion 18 includes terminal edges 26, which are lapped around edges of the base member 14 and hooked onto hooks (not shown) when the distal portion of each projection 20 is in close contact with the front surface 15 of the base member 14. This couples the peripheral layer member 16 to the base member 14. The base member 14 is a first member and formed from a synthetic resin material that is more rigid than the material of the peripheral layer member 16 and is, for example, polypropylene. The base member 14 includes a coupling engagement portion (not shown), which couples the ornament 10 to the vehicle door trim 12. The vehicle door trim 12 includes a plurality of pressing portions 28, which presses and holds the terminal edges 26 of the plate portion 18 when the terminal edges 26 are lapped around the edges of the base member 14. The terminal edges 26 of the plate portion 18 may be fixed to the edges of the base member 14 an adhesive or the like.

Figure 3:
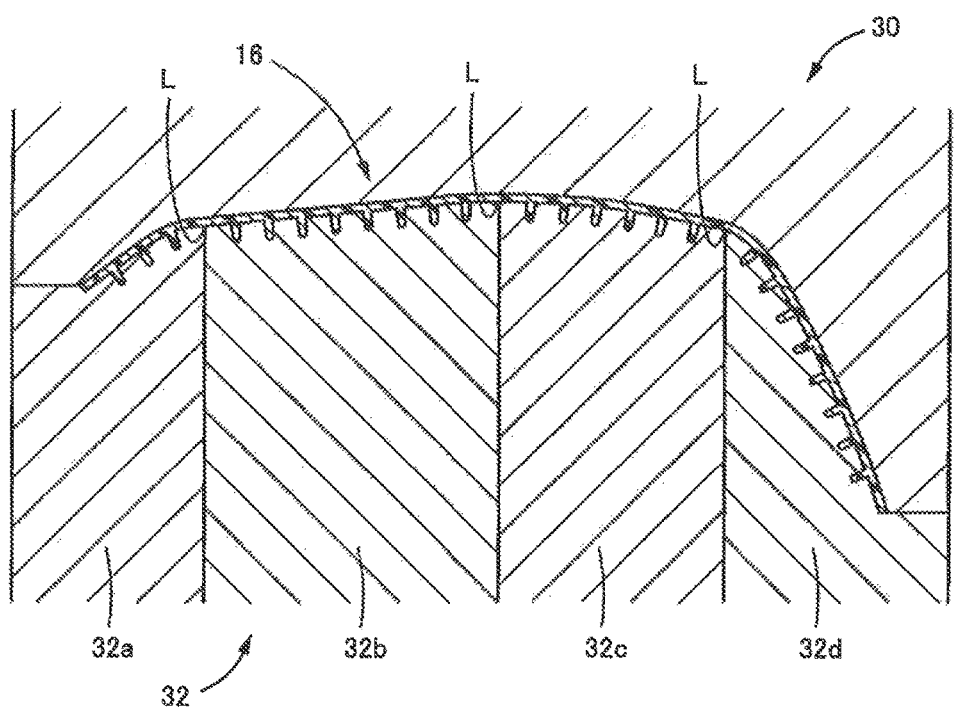
FIG. 3 is a cross-sectional view showing molds that form a peripheral layer member of the ornament.

FIG. 3 is a cross-sectional view of molds that form the peripheral layer member 16. The molds include an upper mold 30 and a lower mold 32. The lower mold 32, which forms the projections 20, includes a plurality of separate molds 32a to 32d taking into consideration the removability and the maintenance of the molds. When the separate molds 32a to 32d are combined for molding, it is difficult to form recesses that mold the projections 20 in the proximity of edges of the separate molds 32a to 32d in order to ensure the strength of the separate molds. FIGS. 4A, 4B are plan views of the peripheral layer member 16 taken from the projections 20. Vacant portions that exclude the projections 20 are formed in the proximity of a mold separation line L, which corresponds to the boundaries of the separate molds 32a to 32d, that is, regions defined by dimensions g1, g2. The dimensions g1, g2 have the same value and are set to be greater than or equal to 1.5 to 2.0 mm so that a predetermined strength is ensured, for example, in accordance with the material of the separate molds 32a to 32d and the shapes of the projections 20. The mold separation line L is straight.

As shown in FIGS. 4A, 4B, the arrangement pattern of the projections 20 differs between a boundary region located in the proximity of the mold separation line L and a general region that is separated from the mold separation line L. Thus, when the projections 20 are separately described, the projections 20 in the general regions are referred to as the general projections 20a, and the projections 20 in the boundary regions are referred to as the boundary projections 20b. FIGS. 4A, 4B partially show the boundary regions and the general regions. FIG. 4A shows the shapes of the projections 20 in a non-pressed state. FIG. 4B shows the shapes of the projections 20 that are deformed by application of a pressing load in a direction orthogonal to the plate portion 18.

Figure 5:
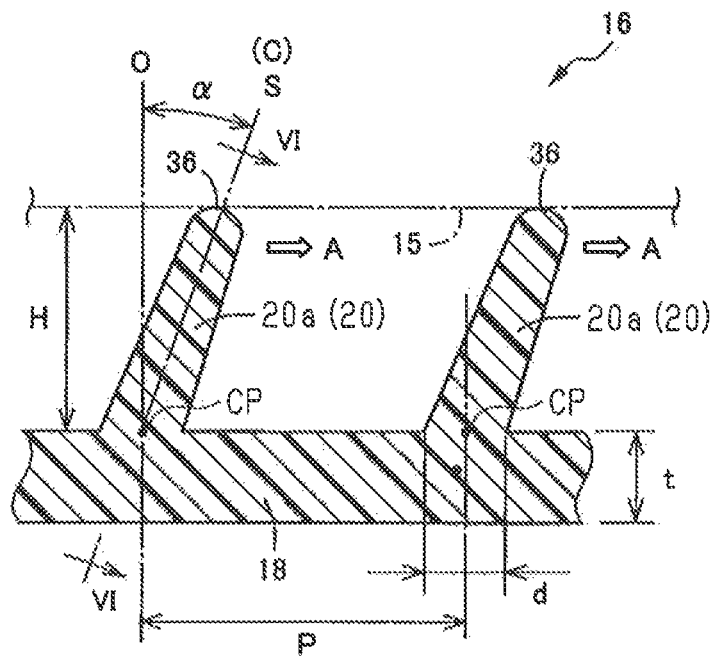
FIG. 5 is a longitudinal cross-sectional view taken along line V-V in FIG. 4A.
Figure 6:
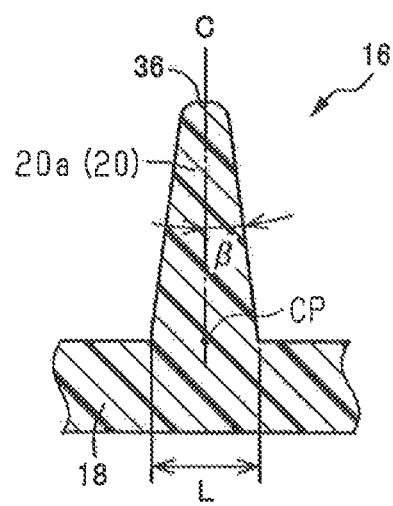
FIG. 6 is a longitudinal cross-sectional view taken along line VI-VI in FIG. 5.
Figure 7:
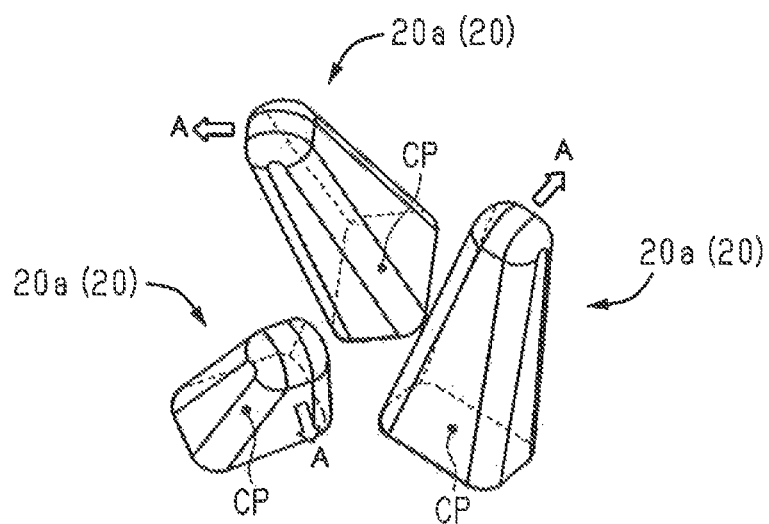
FIG. 7 is a perspective view of projections.

FIG. 5 is an enlarged longitudinal cross-sectional view taken along line V-V in FIG. 4A. FIG. 6 is a longitudinal cross-sectional view taken along line VI-VI in FIG. 5. FIG. 6 is a cross-sectional view of one of the general projections 20a taken along a middle surface S, which is inclined in the same direction as the general projection 20a. FIG. 7 is a perspective view of the general projections 20a taken from obliquely above. As shown in each drawing, the general projections 20a have the same shape. Each of the general projections 20a has an elongated lateral cross-section that is parallel to the plate portion 18. As shown in FIGS. 4A, 4B, a plurality of polygons forms a lattice pattern 34 when each side of the polygons overlaps a side of an adjacent one of the polygons. The general projections 20a are arranged on each side of the polygons. The longitudinal direction of the lateral cross section of each general projection 20a is substantially parallel to the corresponding side of the polygon. The lateral cross section of the general projection 20a has the form of a rectangle having rounded four corners. As indicated by the double-dashed lines in FIGS. 4A, 4B, the lattice pattern 34 has a honeycomb shape in which equilateral hexagons having the same size are continuously repeated. The general projections 20a are individually arranged at the middle of each side of the equilateral hexagons.

The general projection 20a is plate-shaped and has a rectangular lateral cross section. The general projection 20a includes a distal portion 36 and is tapered so that the cross-sectional area becomes smaller toward the distal portion 36. As shown in FIG. 5, the general projection 20a includes the middle surface S, which extends in the middle in the thickness-wise direction. The middle surface S is inclined by the inclination angle α relative to a normal line O, which is orthogonal to the plate portion 18, from the basal portion to the distal portion 36 of the general projection 20a. The middle surface S connects middle lines, which separate the thickness of lateral cross sections that are parallel to the plate portion 18 in half, in the axial direction of the general projection 20a. As shown in FIG. 6, the center surface S includes a center line C, which connects centers of the lateral cross sections parallel to the plate portion 18 in the axial direction of the general projection 20a. As shown in FIG. 1, the plate portion 18 is substantially parallel to the front surface 15 of the base member 14. Thus, the normal line O of the plate portion 18 substantially conforms to a direction orthogonal to the front surface 15 of the base member 14 in a relatively narrow region proximate to each general projection 20a. Additionally, the distal portion 36 of the general projection 20a is in contact with the front surface 15 of the base member 14 at an angle that is substantially the same as the inclination angle α. The range of the inclination angle α is set to $5° \leq α \leq 30°$ so that the distal portion 36 of the general projection 20a slides on the front surface 15 of the base member 14. The distal portion 36 of the general projection 20a has a longitudinal cross section that extends in the thickness-wise direction shown in FIG. 5. The longitudinal cross section in the thickness-wise direction is arcuate. Also, the distal portion 36 of the general projection 20a has a longitudinal cross section that extends in the widthwise direction shown in FIG. 6. The longitudinal cross section in the widthwise direction has two round opposite ends in the width-wise direction. This allows the distal portion 36 of the general projection 20a to slide on the front surface 15 of the base member 14 in one direction A defining the inclination direction.

The general projections 20a will now be described more specifically with reference to FIGS. 5 and 6.

FIG. 5 shows a pitch P, which is the distance between two parallel sides of one of the equilateral hexagons forming the lattice pattern 34, that is, the distance between the centers of the two general projections 20a arranged on the two sides. The range of the pitch P is $4.0 \text{ mm} \leq P \leq 9.0 \text{ mm}$. In the first embodiment, the pitch P is approximately 7.0 mm. Additionally, each general projection 20a has a height H, the range of which is $2.0 \text{ mm} \leq H \leq 5.0 \text{ mm}$. In the first embodiment, the height H is approximately 3.3 mm. The basal portion of the general projection 20a has a thickness d, the range of which is $1.0 \text{ mm} \leq d \leq 2.0 \text{ mm}$. In the first embodiment, the thickness d is approximately 1.2 mm.

FIG. 6 shows a width L of the basal portion of the general projection 20a, the range of which is $1.5 \text{ mm} \leq L \leq 2.5 \text{ mm}$. The width L is set to be greater than the thickness d. In the first embodiment, the width L is approximately 1.8 mm. The general projection 20a includes two opposite surfaces in the width-wise direction, which are inclined relative to the center line C by an inclination angle β. The range of the inclination angle β is $5° \leq β \leq 15°$. In the first embodiment, the inclination angle β is approximately 7°. The general projection 20a has a longitudinal cross section in the width-wise direction that is symmetrical about the center line C. The plate portion 18 has a thickness t, the range of which is $1.0 \text{ mm} \leq t \leq 2.0 \text{ mm}$. In the first embodiment, the thickness t is approximately 1.5 mm.

In the general regions where the general projections 20a are arranged, when the plate portion 18 of the peripheral layer member 16 is pressed by a finger or a hand, the distal portions 36 of the general projections 20a are pressed against the front surface 15 of the base member 14. At this time, the general projections 20a are elastically deformed so as to collapse. This produces a cushioning effect and obtains a particular texture. More specifically, the general projections 20a are inclined in the direction A, which extends in the vicinity of the axis orthogonal to the plate portion 18. Thus, when a load is applied to the plate portion 18 in a substantially orthogonal direction, the distal portions 36 of the general projections 20a slide on the front surface 15 of the base member 14 in the one direction A. Consequently, the general projections 20a are flexibly deformed or bent so as to collapse in the one direction A. This produces a soft texture (cushioning effect). In FIG. 4B, each general projection 20a includes a portion having a series of oblique lines, which shows a planar shape of the general projection 20a that is bent and deformed. The pitch P and the height H of the general projections 20a are set to values such that the bent and deformed general projections 20a do not interfere with one another. The dimensions and angle of each portion of the general projections 20a are set to values that obtain, for example, the desired soft texture and rigidity and the strength taking into consideration the material of the peripheral layer member 16.

The boundary projections 20b, which are located in the boundary regions, are arranged along the mold separation line L in one row at each side of the mold separation line L at equal intervals. The distance between centers of the basal portions of the boundary projections 20b is shorter than the distance between centers of the basal portions of the general projections 20a. As shown in FIGS. 4A, 4B, the general projections 20a are individually arranged at the middle of each side of the equilateral hexagons forming the honeycomb shape. Thus, the general projections 20a that are adjacent to each other along the mold separation line L are not arranged at equal intervals. The boundary projections 20b and the general projections 20a have the same shape. The boundary projections 20b are inclined by the inclination angle α so that the boundary projections 20b are bent in the one direction A as the distal portions 36 slide on the front surface 15 of the base member 14. Additionally, the boundary projections 20b, which are aligned at the opposite sides of the mold separation line L, are bent toward the boundary projections 20b located in the opposing row. More specifically, the boundary projections 20b located in each row are bent and deformed in a direction orthogonal to the mold separation line L. The boundary projections 20b located in the rows are aligned beside each other at the opposite sides of the mold separation line L so that the boundary projections 20b are bent as described above. Each of the boundary projections 20b located in one row are arranged between two of the boundary projections 20b located in the opposing row. The boundary projections 20b are laid out in a staggered arrangement. More specifically, the boundary projections 20b located in one row are not arranged in front of the boundary projections 20b located in the opposing row. In FIG. 4B, each of the boundary projections 20b includes a portion having a series of oblique lines, which shows the planar shape of the boundary projection 20b that is bent. As shown in FIG. 4B, when each of the boundary projections 20b is bent, the distal portion 36 of the boundary projection 20b almost reaches the mold separation line L but does not interfere with one another. The height H of each of the boundary projections 20b may be set to a value that allows the distal portion 36 of the boundary projection 20b to overreach the mold separation line L when the boundary projection 20b is bent and deformed. Further, the boundary projections 20b located in each row may be arranged so that the boundary projections 20b interfere with one another when bent and deformed.

In the first embodiment of the ornament 10, the boundary projections 20b, which are aligned at the opposite sides of the mold separation line L, are laid out in a staggered arrangement so that the boundary projections 20b located in one row are bent toward the boundary projections 20b in the opposing row. Thus, to ensure the strength of the separate molds 32a to 32d, the boundary projections 20b may be separated from the mold separation line L by the predetermined dimensions g1, g2. Even in this case, when the peripheral layer member 16 is pressed by a finger or a hand, the boundary projections 20b located at the opposite sides of the mold separation line L are bent and deformed to fill the vacant portion located in the proximity of the mold separation line L as shown in FIG. 4B. This limits irregular textures that would be caused by decreases in the reaction force in the proximity of the mold separation line L and obtains a uniform texture. In other words, the boundary projection 20b, which are located at the opposite sides of the mold separation line L, are bent but do not interfere with one another. This limits irregularities in the proximity of the mold separation line L.

The boundary projection 20b, which are located at the opposite sides of the mold separation line L, are arranged in rows so that the boundary projections 20b located in each row have the same inclination direction. Thus, recesses are easily formed in the molds that form the boundary projections 20b. This reduces manufacturing costs including the cost for manufacturing the molds.

The general projections 20a are located in the general regions, which are separated from the mold separation line L. The general projections 20a are individually arranged on each side of the polygons forming the lattice pattern 34. This limits variations in the texture of the peripheral layer member 16 when pressed by a finger or a hand. The boundary projections 20b located in the proximity of the mold separation line L cooperate to obtain a superior texture having few irregularities. In particular, the general projections 20a, which have the same shape, are bent and deformed in one direction that extends in the vicinity of the axis. Additionally, the bending directions of the general projections 20a are alternately changed to an outer side and an inner side at each side of the equilateral hexagons forming the lattice pattern 34 having the honeycomb shape. In this case, the general projections 20a are arranged at a high density, and the stances of the general projections 20a are changed in accordance with each side of the equilateral hexagons. This obtains a further uniform texture.

The general projections 20a are distinguished from the boundary projections 20b as described below.

Projections that are at least located proximate to the mold separation line L and aligned along the mold separation line L are defined as the boundary projections 20b. The general projections 20a are distinguished from the boundary projections 20b based on the distance between the boundary projections 20b that are adjacent to each other along the mold separation line L.

When projections are arranged in a row along the mold separation line L at a side of the mold separation line L opposite to the row formed by the above boundary projections 20b, if the distance of the projections is less than or equal to the distance between the above the boundary projections 20b, the projections are defined as the boundary projections 20b. In the first embodiment, the number of rows of the boundary projections 20b is one. However, the boundary projections 20b may be arranged in multiple rows.

When projections are arranged in a row along the mold separation line L at a side of the mold separation line L opposite to the row formed by the above boundary projections 20b, if the distance of the projections is greater than the distance between the above the boundary projections 20b, the projections are defined as the general projections 20a.

The distance used for the above definitions is an inter-projection distance obtained when the projections 20 are not bent and deformed and the peripheral layer member 16 is not pressed toward the base member 14.

Figure 8:
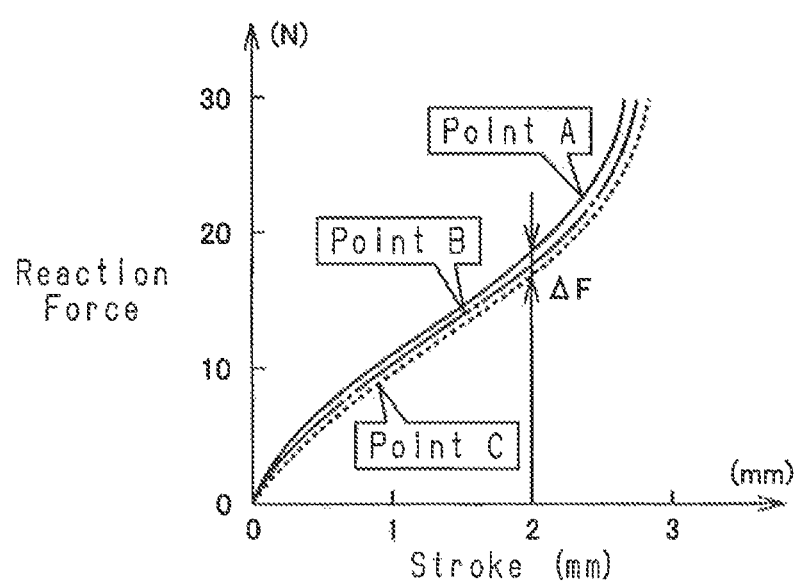
FIG. 8 is a graph of the relationship between the load and the reaction force in points A, B, and C shown in FIG. 4A.

Plate-shaped test samples are formed in the same manner as the peripheral layer member 16. The plate-shaped test samples are orthogonally pressed by a pressing piece from the plate portion 18 to determine characteristics of the reaction force in points A to C shown in FIG. 4A. FIG. 8 shows the results. The pressing piece has a circular distal portion with a diameter of 14 mm. As shown in FIG. 8, even when the stroke of the pressing piece is close to 2 mm, the reaction force difference $\Delta F$ is limed to 3 N or less. This shows that the reaction force difference is extremely small over the entire region of the test piece and that a substantially uniform texture is obtained. FIG. 4A includes hatching portions, each of which is a region that is pressed by the pressing piece with the diameter of 14 mm, indicating the size corresponding to a human fingertip.

Second Embodiment

A second embodiment will now be described. The second embodiment mainly differs from the first embodiment in portions related to the boundary projections. The structure of the second embodiment that is the same as that of the first embodiment will not be described in detail.

As shown in FIGS. 5 and 7, the basal portion of each projection 20 has a rectangular lateral cross section. Also, the projection 20 is an inclined tetragonal pyramid with each corner rounded and is inclined by the inclination angle $\alpha$ relative to the normal line O orthogonal to the plate portion 13.

Thus, when the projection 20 is pressed toward the base member 14, which is parallel to the plate portion 18, a downward force acts on the distal portion 36 of the projection 20 along the normal line O. This bends the projection 20 in a direction that increases the inclination angle $\alpha$. Thus, the projection 20 has anisotropy that restricts the bending direction to the one direction A. The projection 20 includes a bottom surface, the center point of which is referred to as the bottom surface center point CP.

FIG. 14A shows two kinds of the boundary projections 20b, namely, first boundary projections 20b1 and second boundary projections 20b2. The first boundary projections 20b1 and the second boundary projections 20b2 differ from each other only in arrangement position and bending direction but otherwise have the same shape as the projections 20 shown in FIGS. 5 to 7.

As shown in FIG. 14A, the first boundary projections 20b1, each of which has a bottom surface center point CP1, are arranged so that an arrangement line L1 connecting the bottom surface center points CP1 is parallel to the mold separation line L. Also, the first boundary projections 20b1, each of which has a bending direction A1, are arranged so that the bending direction A1 intersects with the arrangement line L1 and the perpendicular line of the arrangement line L1 and extends away from the mold separation line L. The first boundary projections 20b1 correspond to a first projection and a third projection.

The second boundary projections 20b2, each of which has a bottom surface center point CP2, are arranged so that an arrangement line L2 connecting the bottom surface center points CP2 is parallel to the mold separation line L and separated slightly further from the mold separation line L than the arrangement line L1. Also, the second boundary projections 20b2, each of which has a bending direction A2, are arranged so that the bending direction A2 intersects with the arrangement line L2 and the perpendicular line of the arrangement line L2 and extends toward the mold separation line A. The second boundary projections 20*b*2 correspond to a second projection and a fourth projection.

As shown in FIG. 14B, the first boundary projections 20*b*1 and the second boundary projections 20*b*2 are alternately arranged as viewed from the mold separation line L. Additionally, as indicated by oblique lines in FIG. 14B, in the first boundary projections 20*b*1 and the second boundary projections 20*b*2, the distance between adjacent ones of the projections and the shape size of the projections are each set so that the distal portions 36 of the projections do not come into contact with the distal portions of adjacent projections when the projections are bent and deformed.

The first boundary projections 20*b*1 and the second boundary projections 20*b*2 are located at each side of the mold separation line L and opposed to each other.

The operation and advantages of the above structure will now be described.

(1) The first boundary projections 20*b*1 are arranged in the arrangement line L1, which is parallel so the mold separation line A. Also, the second boundary projections 20*b*2 are arranged in the arrangement line L2, which is parallel to the mold separation line L and separated further from the mold separation line L than the arrangement line L1. As viewed from the mold separation line L, the first boundary projections 20*b*1 and the second boundary projections 20*b*2 are alternately arranged. This avoids linear arrangement of thick portions of the boundary projections 20*b* in the peripheral layer member 16. Thus, formation of uneven luster is limited in the ornamental surface 19 of the peripheral layer member 16, which is located at a side opposite to the projections 20.

(2) The projections 20 have anisotropy that limits the bending direction to the one direction A. Additionally, as shown in FIGS. 14A and 14B, the bending direction A1 of each first boundary projection 20*b*1 extends away from the mold separation line L, and the bending direction A2 of each second boundary projection 20*b*2 extends toward mold separation line L. The bending directions A1, A2 of the first and second boundary projections 20*b*1, 20*b*2 intersect with each other. Thus, the bottom surface of the basal portion of each first boundary projection 20*b*1 differs in direction from the bottom surface of the basal portion of each second boundary projection 20*b*2. This alternately changes angles at which the mold separation line intersects with the basal portion of each of the first boundary projections 20*b*1 and the second boundary projections 20*b*2, that is, a line segment LG1 that is parallel to the longitudinal direction of the bottom surface of the basal portion. Thus, the first boundary projections 20*b*1 and the second boundary projections 20*b*2 are arranged in a zigzag manner. This limits the formation of uneven luster in the ornamental surface 19 of the peripheral layer member 16, which is located at a side opposite to the projections 20.

(3) The distal portions 36 of the first and second boundary projections 20*b*1, 20*b*2 are connected to each other by a line segment LG2. The line segment LG2 is arranged in a zigzag manner in the same manner as described above. The distal portions 36 of the first and second boundary projections 20*b*1, 20*b*2 correspond to contact points that are in contact with the front surface 15 of the base member 14. This structure avoids concentration of the contact points in the proximity of the mold separation line L and disperses the reaction force caused by the bending and deformation of the projections as compared to when an imaginary line that connects the contact points is arranged linearly. This limits irregular textures in the proximity of the mold separation line.

Other embodiments of the present invention will now be described. The same reference characters are given to those components of the following embodiments that are substantially the same as the corresponding components of the above embodiments. Such components will now be described in detail.

Figure 9A:
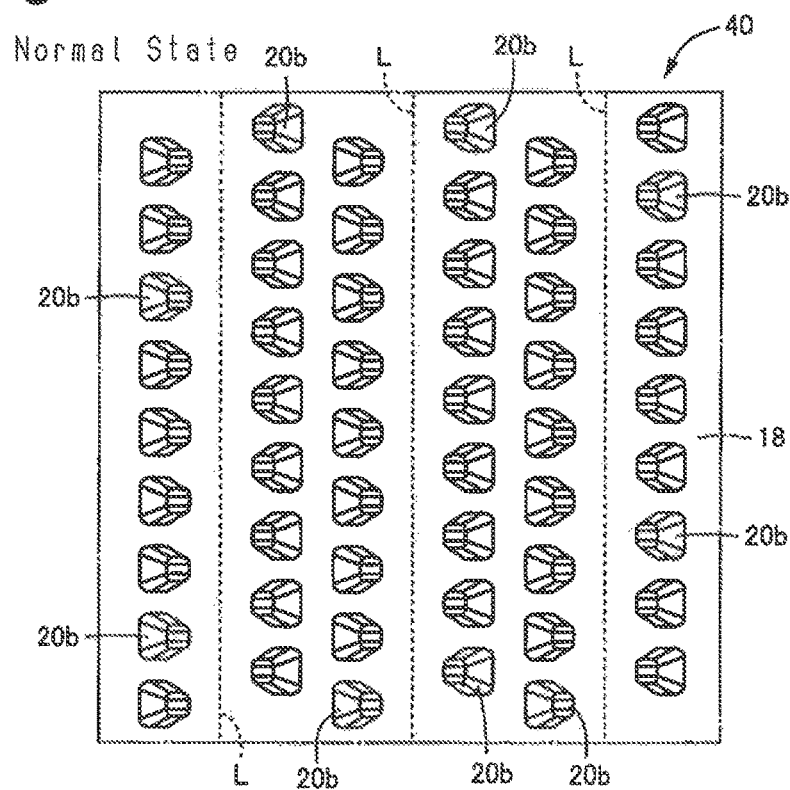
FIGS. 9A and 9B are plan views showing another embodiment of a peripheral layer member.
Figure 9B:
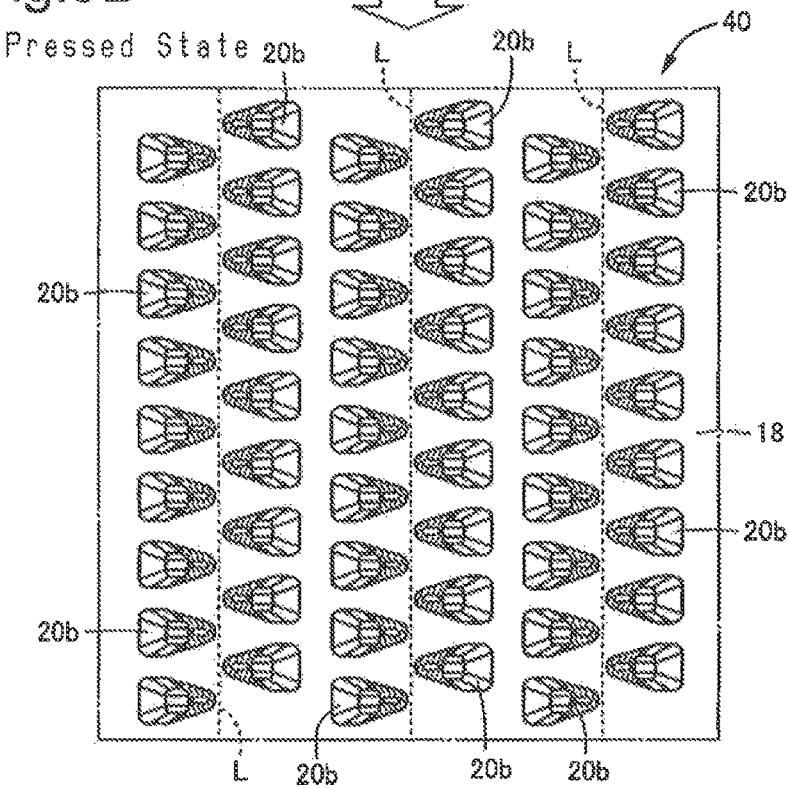

FIGS. 9A, 9B are plan views corresponding to FIGS. 4A 4B. In the peripheral layer member 40 shown in FIGS. 9A, 9B, the distance between the mold separation lines L is shortened. In this case, the projections 20 include only the boundary projections 20*b* that are opposed to each other at opposite sides of the mold separation line L and laid out in a staggered arrangement. In this case, vacant portions having no projections 20 are also formed in the proximity of the mold separation line L. However, as shown in FIG. 9B, when the peripheral layer member 40 is pressed by a finger or a hand, the boundary projections 20*b* are bent and deformed to fill the vacant portions in the proximity of the mold separation line L. This limits irregular textile that would be caused by decreases in the reaction force in the proximity of the mold separation line L and obtains a uniform texture.

Figure 10:
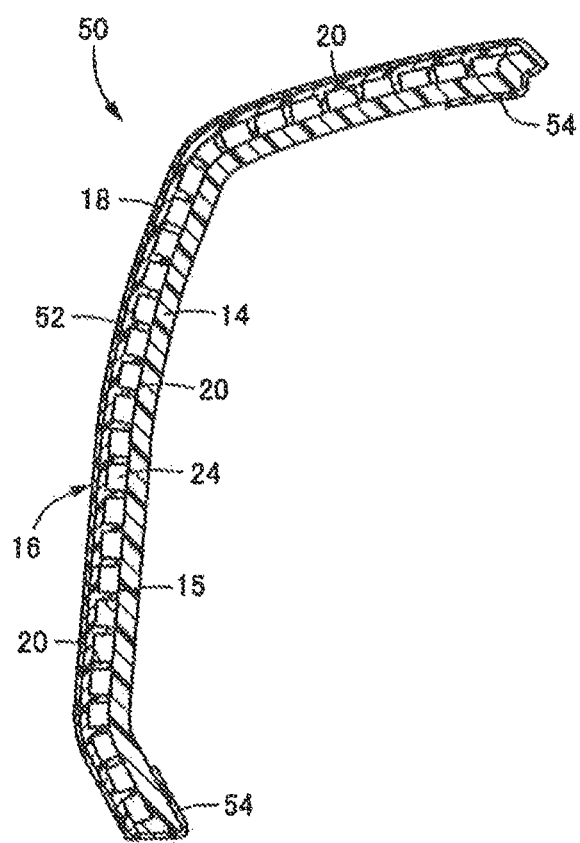
FIG. 10 is a cross-sectional view of another embodiment in which a covering member is fixed to a peripheral layer member.

FIG. 10 shows an ornament 50 that includes a covering member 52, which is arranged on the front surface of the peripheral layer member 16, that is, a surface of the plate portion 18 opposite to the projections 20. The ornament 50 has a three-layer structure formed by the peripheral layer member 16, the covering member 52 fixed to the peripheral layer member 16, and the plate-shaped base member 14. The covering member 52 is formed by, for example, a woven cloth, a non-woven cloth, a knitted cloth, vinyl chloride, or a soft film. The covering member 52 is simultaneously molded with the peripheral layer member 16. This fixes the covering member 52 to the front surface of the peripheral layer member 16. The covering member 52 includes terminal edges 54, which are lapped around edges of the base member 14 and hooked onto hooks (not shown). This couples the ornament 50 to the vehicle door trim 12. In this state, the terminal edges 54 of the covering member 52 are pressed by the pressing portions 28 of the vehicle door trim 12 against the edges of the base member 14. This couples the peripheral layer member 16 to the base member 14 together with the covering member 52.

The ornament 50 has the same advantages as the ornament 10. Additionally, the peripheral layer member 16 is covered by the covering member 52. Thus, even when sink marks and uneven luster are formed on the surface of the peripheral layer member 16 located at a side opposite to the projections 20, the covering member 52 prevents exposure of such sink marks and uneven luster and damage to the peripheral layer member 16. This widens the range for selecting the resin material of the peripheral layer member 16 and increases the degree of freedom for designing the shape of the projections 20. Thus, the texture of the peripheral layer member 16 may be easily adjusted.

Figure 11:
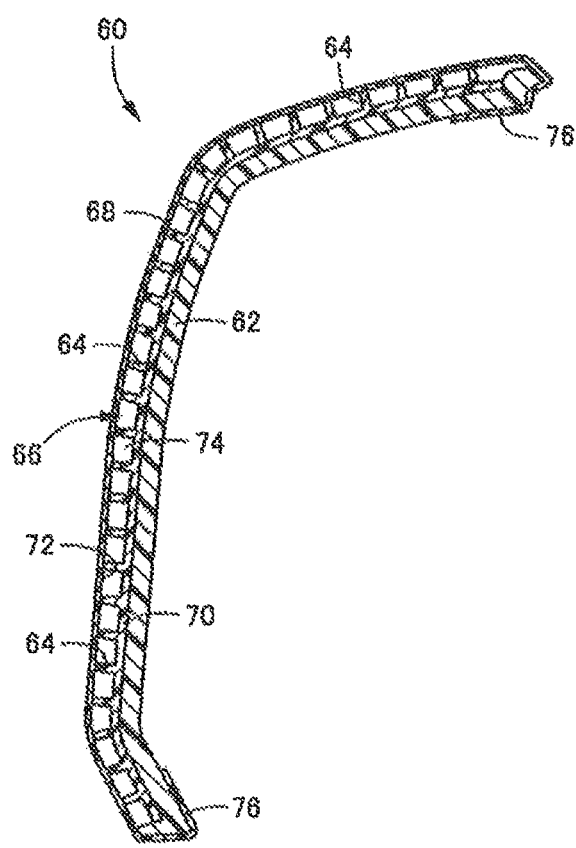
FIG. 11 is a cross-sectional view showing another embodiment in which a first member is a peripheral layer member and a second member is fixed to a base member.
Figure 12A:
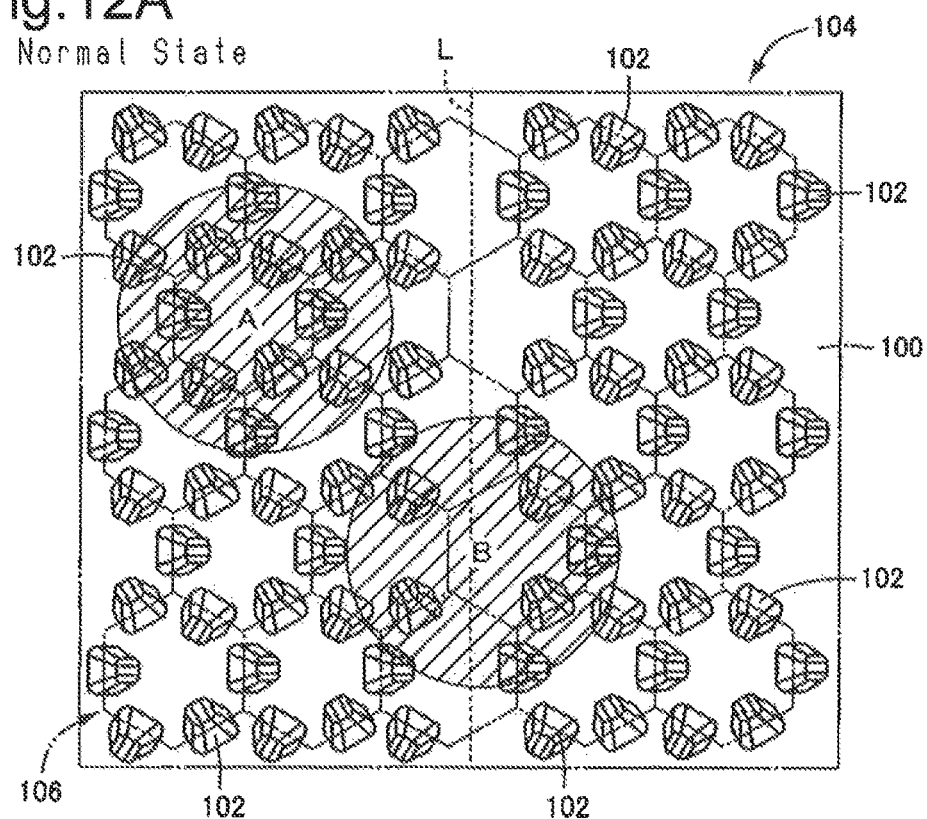
FIG. 12A is a plan view showing a second member of a prior art multilayer composite interior component in a non-pressed state.
Figure 12B:
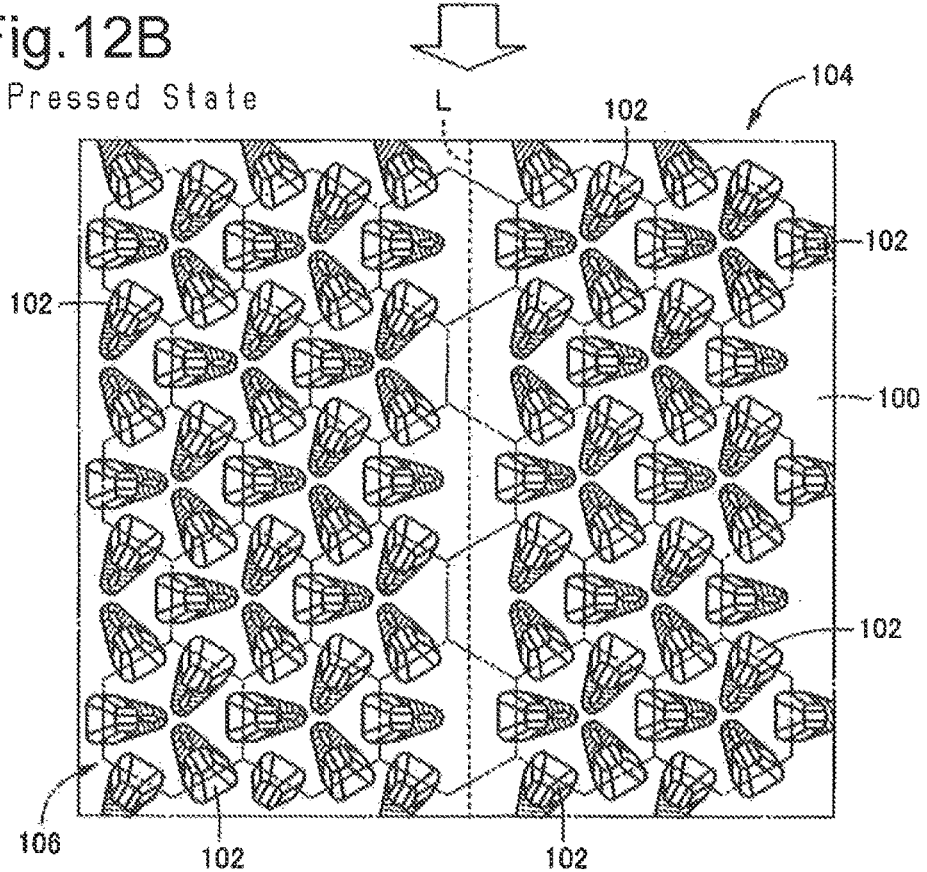
FIG. 12B is a plan view showing the deformed shape of each projection in a pressed state.
Figure 13:
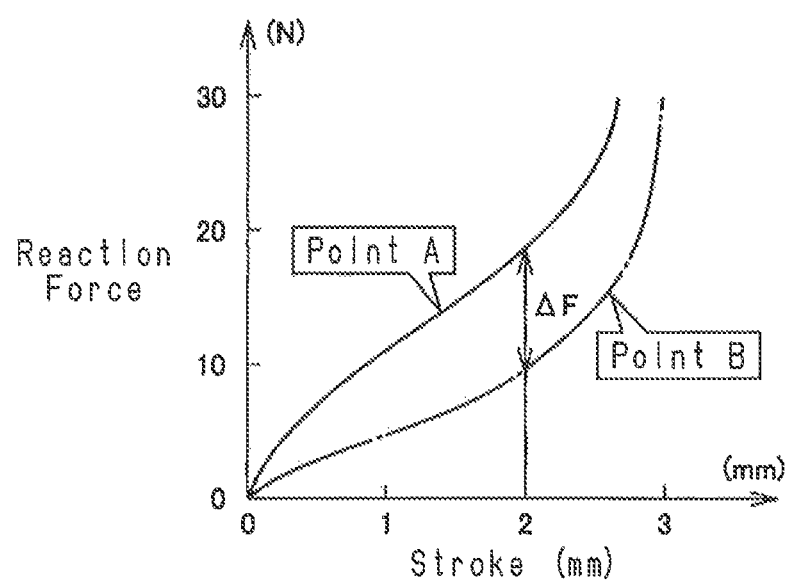
FIG. 13 is a graph of the relationship between the pressing load and the reaction force in points A, B shown in FIG. 12A.

FIG. 11 shows an ornament 60 that includes a plate-shaped base member 62 and a cushion member 66 including a plurality of projections 64 arranged on the front surface of the base member 62. The cushion member 66 includes a surface that is located at a side of the projections 64 and on which a peripheral layer member 68 is arranged. The base member 62 is formed from a relatively rigid synthetic resin material in the same manner as the base member 14. The cushion member 66 corresponds to a second member and is formed from an elastically deformable synthetic resin material in the same manner as the peripheral layer member 16. The cushion member 66 also includes a plate portion 70, which is closely fixed to the front surface of the base member 62. The projections 64 are arranged on the plate portion 70. For example, in the same manner as the projections 20, the projections 64 project from the plate portion 70 toward the peripheral layer member 68 at the inclination angle α to define a gap 71 between a rear surface 72 of the peripheral layer member 68 and the plate portion 70. The projections 64 include distal portions that are in close contact with the rear surface 72 of the peripheral layer member 68. The rear surface 72 corresponds to a joining surface. The peripheral layer member 68 corresponds to a first member. In the present embodiment, the peripheral layer member 68 is formed from a relatively soft synthetic resin material in the same manner as the peripheral layer member 16. The peripheral layer member 68 includes terminal edges 76. With the terminal edges 76 lapped around edges of the base member 62, the ornament 60 is coupled to the vehicle door trim 12. Thus, the terminal edges 76 of the peripheral layer member 68 are pressed by the pressing portions 28 of the vehicle door trim 12 to the edges of the base member 62. This couples the peripheral layer member 68 to the base member 62. The peripheral layer member 68 may further include the covering member 52.

When the peripheral layer member 68 of the ornament 60 is pressed by a finger or a hand, the rear surface 72 of the peripheral layer member 68 is pressed against the distal portions of the projections 64 of the cushion member 66. At this time, the projections 64 are elastically deformed to obtain a superior textile. Additionally, the cushion member 66 is covered by the peripheral layer member 68, and the plate portion 70 of the cushion member 66 is fixed to the base member 62. In this structure, even when sink marks and uneven luster are formed on a surface of the plate portion 70 located at a side opposite to the projections 64, exposure of such sink marks and uneven luster is prevented. Additionally, in this case, the range for selecting she resin material of the cushion member 66 is widened thereby increasing the degree of freedom for designing the shape of the projections 64. Thus, the texture of the peripheral layer member 68 may be easily adjusted.

The surface of the cushion member 66 located at the side of the projections 64 is molded by a plurality of separate molds in the same manner as the peripheral layer member 16. Thus, vacant portions having no projections 64 are formed in the proximity of each mold separation line, which is not shown in the drawings. In this regard, in the same manner as shown in FIGS. 4A, 4B, the present embodiment includes a plurality of boundary projections 64*b* located at opposite sides of the mold separation line and laid out in a staggered arrangement so that the boundary projections 64*b* are bent and deformed toward opposing ones of the boundary projections 64*b*. Also, in the same manner as shown in FIGS. 4A, 4B, a plurality of general projections 64*a*, is arranged in the general regions, which are separated from the mold separation lines, so that the bending directions of the general projections 64*a* are alternately changed to the outer side and the inner side at each side of the equilateral hexagons forming the lattice pattern 34. This limits irregular textures that would be caused by decreases in the reaction force in the proximity of the mold separation line in the same manner as the ornament 10. Thus, a further uniform texture is obtained.

In the second embodiment, the bending direction A1 of each first boundary projection 20*b*1 intersects the arrangement line L1, which is parallel to the mold separation line L, and the perpendicular line of the arrangement line L1. Instead, as shown in FIGS. 15A, 15B, the bending direction A1 of the first boundary projection 20*b*1 may be changed to a direction that extends along the perpendicular line of the arrangement line L1, that is, a direction orthogonal to the arrangement line L1. Also, the bending direction A2 of each second boundary projection 20*b*2 intersects the arrangement line L2, which is parallel to the mold separation line L, and the perpendicular line of the arrangement line L2. Instead, as shown in FIGS. 15A, 15B, the bending direction A2 of each second boundary projection 20*b*2 may be changed to a direction that extends along the perpendicular line of the arrangement line L2, that is, a direction orthogonal to the arrangement line L2. Also, in this structure, the line segment LG1 of the basal portion of each of the first boundary projections 20*b*1 and the second boundary projections 20*b*2 is arranged in a zigzag manner. Thus, advantage (1) of the second embodiment is obtained.

In the second embodiment, the first boundary projections 20*b*1 are arranged on the arrangement line L1, and the second boundary projections 20*b*2 are arranged on the arrangement line L2. Instead, the first boundary projections 20*b*1 and the second boundary projections 20*b*2 may be arranged in the same arrangement line. Also, in this structure, as long as the bending directions A1, A2 intersect with each other, the line segments LG1 of the basal portions of the first boundary projections 20*b*1 and the second boundary projections 20*b*2 are arranged in a zigzag manner. Thus, advantage (2) of the second embodiment is obtained.

The embodiments of the present invention have been described in detail based on the drawings. However, additional changes and modifications may be applied to embodiments of the present invention based on the knowledges of those skilled in the art.

The invention claimed is:

1. A multilayer composite interior component comprising:
a first member; and
a second member that is arranged on the first member, wherein
the second member is formed using a plurality of separate molds,
the second member includes
a plurality of general projections, each projecting toward the first member, wherein the general projections are bent by contact with the first member, and
a plurality of boundary projections located between a mold separation line of the separate molds and the general projections and projecting toward the first member, wherein the boundary projections are bent by contact with the first member,
the boundary projections are arranged at equal intervals in rows along the mold separation line at opposite sides of the mold separation line, and
each interval of the boundary projections is shorter than a distance between the general projections located adjacent to each other along the mold separation line.

2. The multilayer composite interior component according to claim 1, wherein
the second member includes a projection surface on which the boundary projections project, and
the boundary projections project in a state inclined toward the mold separation line relative to a normal line that is orthogonal to the projection surface of the second member.

3. The multilayer composite interior component according to claim 1, wherein
the boundary projections are located at opposite sides of the mold separation line, and the boundary projections located at one side of the mold separation line are not opposed to the boundary projections located at the other side of the mold separation line.

4. The multilayer composite interior component according to claim 1, wherein
the second member includes an ornamental surface located at a side opposite to the general projections and the boundary projections,
the boundary projections include a first projection located at a position separated from the mold separation line by a first distance and a second projection located at a position separated from the mold separation line by a second distance that differs from the first distance, and
the first projection and the second projection are alternately arranged as viewed from the mold separation line.

5. The multilayer composite interior component according to claim 1, wherein
each of the general projections and the boundary projections includes a basal portion and a distal portion and is formed by a conical body, the contour of which is gradually decreased from the basal portion toward the distal portion, and
the basal portion has a cross section that has a line-symmetric shape and extends longer in a perpendicular direction than in a particular direction, wherein the perpendicular direction is orthogonal to the particular direction.

6. The multilayer composite interior component according to claim 5, wherein
the boundary projections include a third projection arranged to be directed in a first direction that extends away from the mold separation line and a fourth projection arranged to be directed in a second direction that extends toward the mold separation line,
each of the first direction and the second direction corresponds to the particular direction,
the second direction intersects the first direction, and
the third projection and the fourth projection are alternately arranged as viewed from the mold separation line.

7. The multilayer composite interior component according to claim 1, wherein
a plurality of polygons, each of which has sides, forms a lattice pattern when each side of the polygons overlaps a side of an adjacent one of the polygons, and
the general projections are arranged on each side of the polygons.

8. The multilayer composite interior component according to claim 7, wherein
the first member includes a joining surface,
the second member includes a plate portion located parallel to the joining surface of the first member,
the plate portion includes the general projections,
the general projections have a flexural rigidity against a load applied in a direction orthogonal to the plate portion, wherein the flexural rigidity is anisotropic in the vicinity of an axis that is orthogonal to the plate portion,
each of the general projections is configured to be bent in one direction that extends in the vicinity of the axis as the distal portion slides on the joining surface,
the lattice pattern has a honeycomb shape in which equilateral hexagons having a fixed size are continuously repeated,
each side of the equilateral hexagons has one of the general projections arranged thereon, and
a bending direction of the general projections is alternately changed to an inner side and an outer side at the sides arranged about a center of each of the equilateral hexagons.

9. A multilayer composite interior component comprising:
a first member including a predetermined joining surface; and
a second member arranged on the first member and formed from an elastically deformable synthetic resin, wherein
the second member includes a plate portion that is substantially parallel to the joining surface,
the plate portion includes a plurality of projections, each projecting toward the joining surface to define a gap between the plate portion and the joining surface,
each of the projections includes a distal portion,
the second member is arranged on the first member with the distal portions of the projections in contact with the joining surface,
the distal portions of the projections are pressed and elastically deformed by the joining surface thereby producing a cushioning effect,
the second member includes a surface located at a side of the projections and formed using a plurality of separate molds,
boundary projections located at each of opposite sides of a mold separation line of the separate molds are arranged in one row at equal intervals along the mold separation line,
the boundary projections have a flexural rigidity against a load applied in a direction orthogonal to the plate portion, wherein the flexural rigidity is anisotropic in the vicinity of an axis that is orthogonal to the plate portion,
each of the boundary projections includes a distal portion and is configured to be bent in one direction that extends in the vicinity of the axis as the distal portion slides on the joining surface,
the boundary projections located at the opposite sides of the mold separation line are arranged to be bent toward the boundary projections located in an opposing row,
each of the boundary projections is located at an intermediate portion of adjacent ones of the boundary projections located in the opposing row, and
the boundary projections are laid out in a staggered arrangement.

10. The multilayer composite interior component according to claim 9, wherein
the boundary projections have the same shape,
each of the boundary projections includes a basal portion and has a center line that is inclined at the basal portion relative to a direction orthogonal to the plate portion,
each of the boundary projections is bent in an inclination direction that corresponds to one direction that extends in the vicinity of the axis, and
the boundary projections located at the opposite sides of the mold separation line are arranged in rows so that the inclination directions of the boundary projections are the same in each row.

11. The multilayer composite interior component according to claim 10, wherein
the second member includes a general region separated from the mold separation line,
a plurality of general projections is arranged in the general region, a plurality of polygons, each of which has sides, forms a lattice pattern when each side of the polygons overlaps a side of an adjacent one of the polygons, and the general projections are arranged on each side of the polygons.

12. The multilayer composite interior component according to claim 11, wherein the general projections have the same shape, the general projections have a flexural rigidity against a load applied in a direction orthogonal to the plate portion, wherein the flexural rigidity is anisotropic in the vicinity of an axis that is orthogonal to the plate portion, each of the general projections includes a distal portion and is configured to be bent in one direction that extends in the vicinity of the axis as the distal portion slides on the joining surface, the lattice pattern has a honeycomb shape in which equilateral hexagons having a fixed size are continuously repeated, each side of the equilateral hexagons has one of the general projections arranged therein, and a bending direction of the general projections is alternately changed to an inner side and an outer side at the sides arranged about a center of each of the equilateral hexagons.

\* \* \* \* \*